July 12, 1938.    S. GOOSSÓN    2,123,529
APPARATUS FOR MAKING PROCESS SHOTS IN MOTION PICTURE PHOTOGRAPHY
Filed April 3, 1936    4 Sheets-Sheet 2

Inventor
Stephen Goosson
By
Attorney

July 12, 1938.  S. GOOSSÓN  2,123,529
APPARATUS FOR MAKING PROCESS SHOTS IN MOTION PICTURE PHOTOGRAPHY
Filed April 3, 1936  4 Sheets-Sheet 3
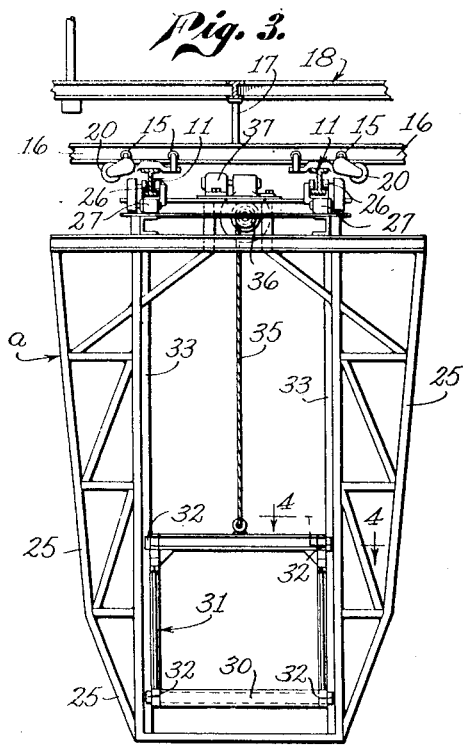
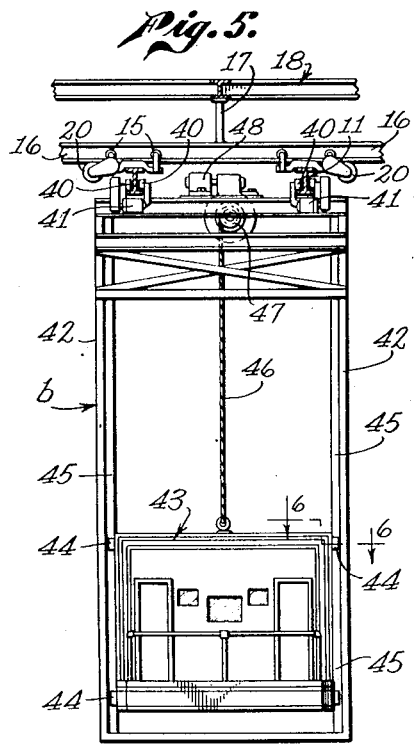
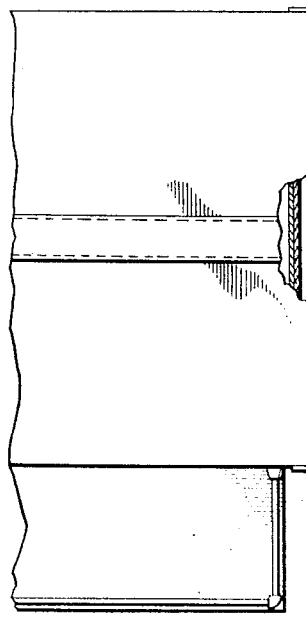
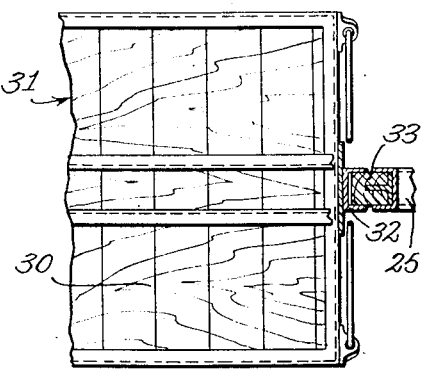
Inventor
Stephen Goosson
By
Attorney

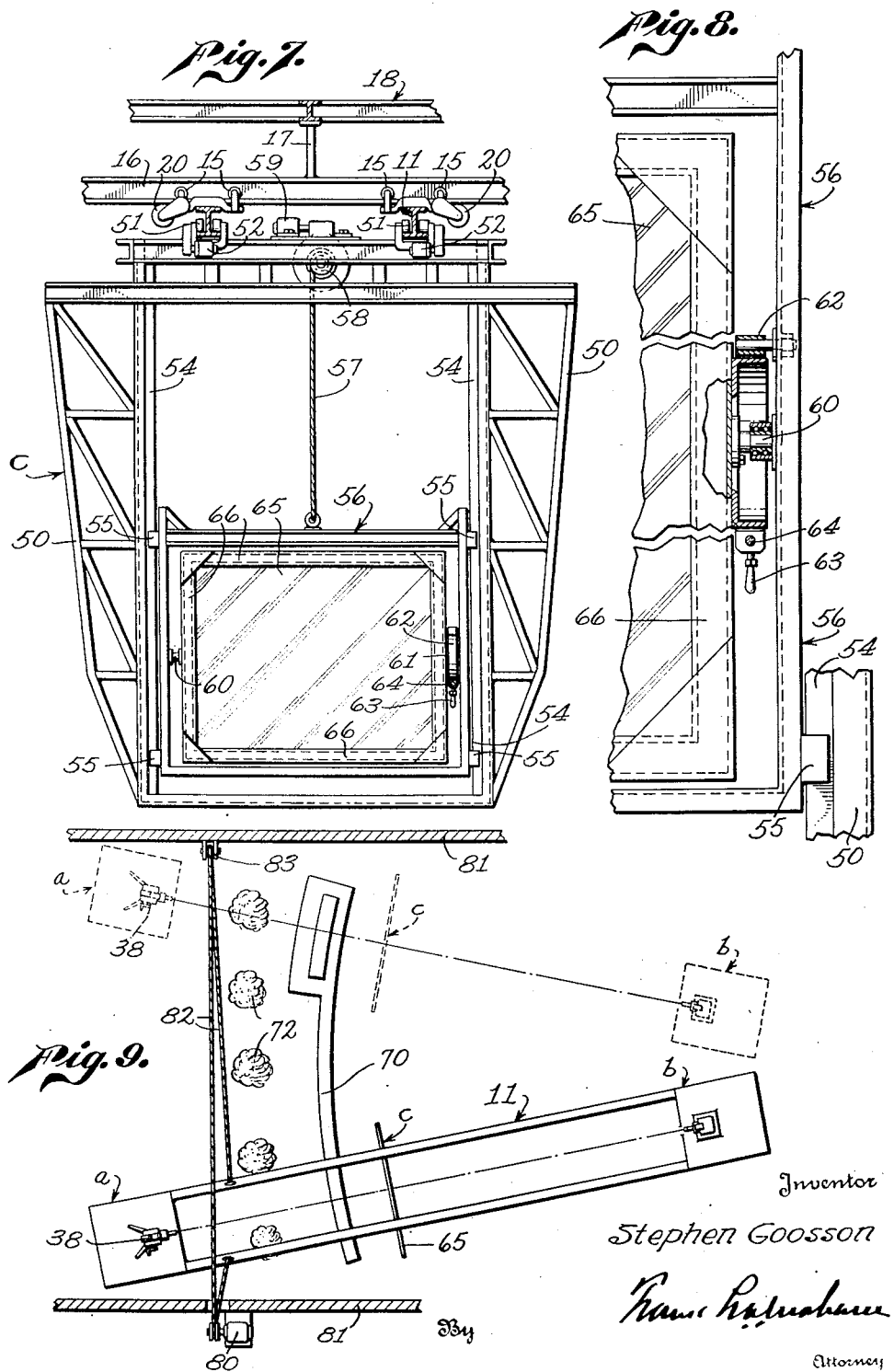

Patented July 12, 1938

2,123,529

UNITED STATES PATENT OFFICE 2,123,529

APPARATUS FOR MAKING PROCESS SHOTS IN MOTION PICTURE PHOTOGRAPHY

Stephen Goossón, Hollywood, Calif., assignor to Columbia Pictures Corporation of California, Ltd., a corporation of California Application April 3, 1936, Serial No. 72,612

4 Claims. (Cl. 88—16)

My invention relates to the art of motion picture photography and particularly to that branch of motion picture photography which is commonly referred to as "process shots." This may be generally stated as the projection of a picture on a translucent screen which forms the background for action taken in front of the screen. In the ordinary method of practice of motion picture photography of this character the projector, the screen and the camera are stationary but so arranged with respect to each other that the lenses of the projector and camera are on the same axis. This arrangement has several disadvantages, the most important of which is the fact that where the action consists of persons or other moving objects the interval in which the action may be taken before the action has passed beyond the limits of the screen is necessarily limited and to overcome this fault it has been the practice to have the action take place upon a tread-mill which permits the actors to move with some semblance of natural action, such as walking, but which has the decided disadvantage of not only detracting from the natural movements of the actor but also has the disadvantage in that the actors become dizzy and confused and in many instances fall from the tread-mill during the taking of a scene. The principal object of my present invention is to produce apparatus which permits the actors to walk upon a stationary support preferably upon the natural floor of the studio, and I accomplish this object by mounting the projector, the translucent screen and the camera so that they may be moved simultaneously over the floor in alignment with each other, that is, with the lenses of the camera and projector in the same axis which axis passes through the screen, the action being arranged between the camera and the screen upon a stationary platform or floor of the stage. By using this arrangement the actors moving over the floor or other stationary support, are entirely natural in their movements and due to the fact that the projector, screen and camera move as a unit the action may be lengthened accordingly.

Another advantage of my invention is that stationary objects such as trees, shrubs, fences and buildings may be interposed between the camera and the screen making the foreground of the picture more realistic and due to the fact that the apparatus may be made to swing through a long arc the objects referred to in the foreground or before the screen may be varied in different portions of the path of movement which feature also lends itself to the production of a more natural completed picture.

Other objects and advantages will appear hereinafter from the following description and drawings.

Referring to the drawings, which are for illustrative purposes only—

Fig. 3 is an enlarged sectional view on line 3—3 of Fig. 1;

Fig. 4 is a fragmentary sectional plan view on line 4—4 of Fig. 3;

Fig. 5 is a cross sectional view similar to Fig. 3 on line 5—5 of Fig. 1;

Fig. 6 is a sectional plan view on line 6—6 of Fig. 5;

Fig. 7 is an enlarged cross sectional view on line 7—7 of Fig. 1;

Fig. 8 is an enlarged view partly in section of the screen supporting means shown in Fig. 7;

Fig. 9 is a diagrammatical plan view of a portion of the apparatus shown in Fig. 1, the apparatus being shown in two positions;

Fig. 10 is a diagrammatical side view of the apparatus shown in Fig. 1, the view illustrating the position of the camera, screen and projection machine arranged for the camera to take the shot downwardly at an angle over the action; and Fig. 11 is a side elevation, partly in section, of the pivotal mounting of the boom.

Figure 2:
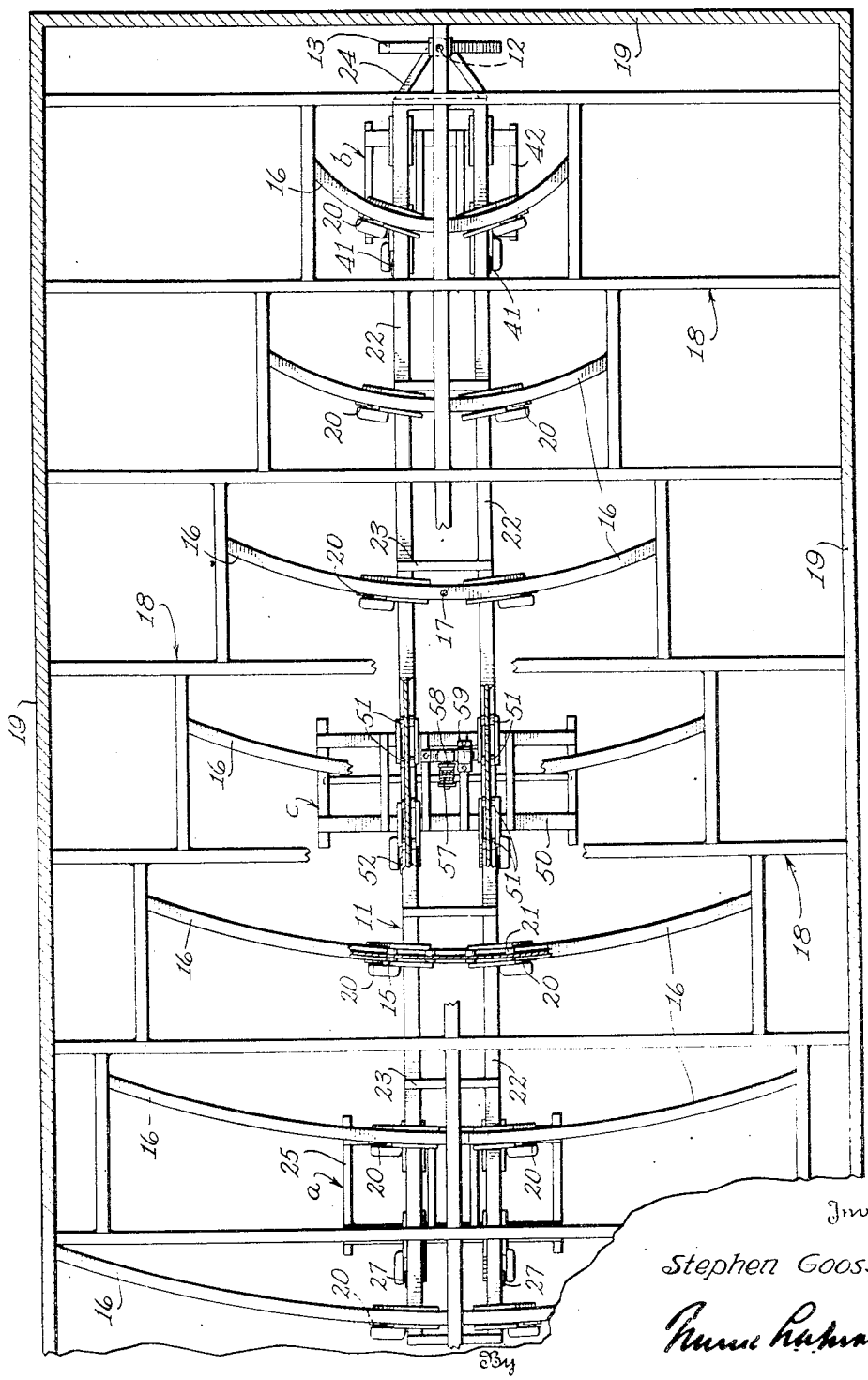
Fig. 2 is a plan view of the apparatus shown in Fig. 1, particularly illustrating the overhead supporting structure for the apparatus.

More particularly referring to the drawings, 11 designates a supporting structure which, in the form shown, consists of a boom pivotally mounted as shown at 12, particularly in Fig. 11, to vertical standards 13. The boom 11 is supported by means of rollers 15 on circular tracks 16 which in the form shown consist of I beams connected by means of hangers 17, with overhead frame work 18, supported by the walls of the building indicated at 19. Each set of rollers 15 is provided with a motor 20, which through suitable connections, not shown, rotates the rollers 15 on their supporting track. With this arrangement, just described, it will be understood that the boom may be caused to swing in an arc about its center or pivot and while I have shown the curved tracks 16 of short length as illustrated in Fig. 2, it is to be understood that the supporting structure and tracks may be of such size and length respectively as to permit the boom to revolve about its center in a complete circle. The movable boom, above described, constitutes a supporting means for a projector, translucent screen and a camera, these three units being so arranged and supported that the relative position of the units, with respect to each other, may be varied as occasion may require depending upon the character of the completed picture desired, that is for instance, the distance between the camera and screen may be varied to vary the length of the shot desired. Each of these units, that is, the camera, screen and projection machine are separately and independently mounted on the boom, and in the form shown are suspended from the boom, the lower ends of the units being spaced above the floor, indicated at 21, so that the boom with its suspended units may move freely over the floor.

In the form shown, the boom 11 consists of two longitudinal members 22 connected by means of suitable cross bars 23, the inner end of the boom being provided with a head 24, forming a part of the pivotal connection of the boom to the standards 13.

The camera unit, generally indicated at "a", consists of a frame 25 supported by means of rollers 26 on the longitudinal beams 22 of the boom 11. Certain of these rollers 26 are provided with motors indicated at 27, by means of which the unit may be moved on the boom. 30 designates the platform of an elevator 31, the elevator having shoes 32 shown in Fig. 3, which slidably engage vertical guides 33. The elevator 31 is supported by a cable 35 wound on drum 36 which is operated by means of an electric motor 37 so that the vertical height of the elevator may be varied with respect to the floor, it being understood that any desired form of motion picture camera such as diagrammatically illustrated at 38 in Fig. 10, is placed on the floor 30.

The projection unit, indicated generally by the letter "b", is also suspended on the boom 11 in the same manner as described with respect to the unit "a", that is, rollers 40 are provided, mounted on the top of the unit, the rollers 40 being driven by motors 41. Movable vertically in a frame 42 is a projection booth 43, the projection booth having shoes 44 which slide upon guide members 45. The projection booth 43 may be raised and lowered by means of a cable 46 mounted on a drum 47 operated by means of electric motor 48.

The screen unit "c" consists of a frame 50, which is suspended from the boom 11 by means of rollers 51 mounted on the top of the frame 50 and provided with electric motors 52 for movement of the unit along the boom. The unit "c" is provided with vertical guides 54 which are engaged by shoes 55 mounted on the screen frame 56, being vertically movable by means of the cable 57 mounted on a drum 58 which is controlled by an electric motor 59. The screen frame 56 is not only movable vertically in the frame 54 of the unit but the screen itself is so mounted that it may be swung on a horizontal axis. This is accomplished by mounting the screen on bearings 60. The screen is also provided with a brake drum 61 engaged by a brake band 62 mounted on the frame 56, which may be tightened to hold the screen in tilted position by a handle 63 and bolt 64. The screen 65 may be of any conventional form, preferably a translucent screen reinforced along its edges by means of a suitable binding indicated at 66.

Figure 1:
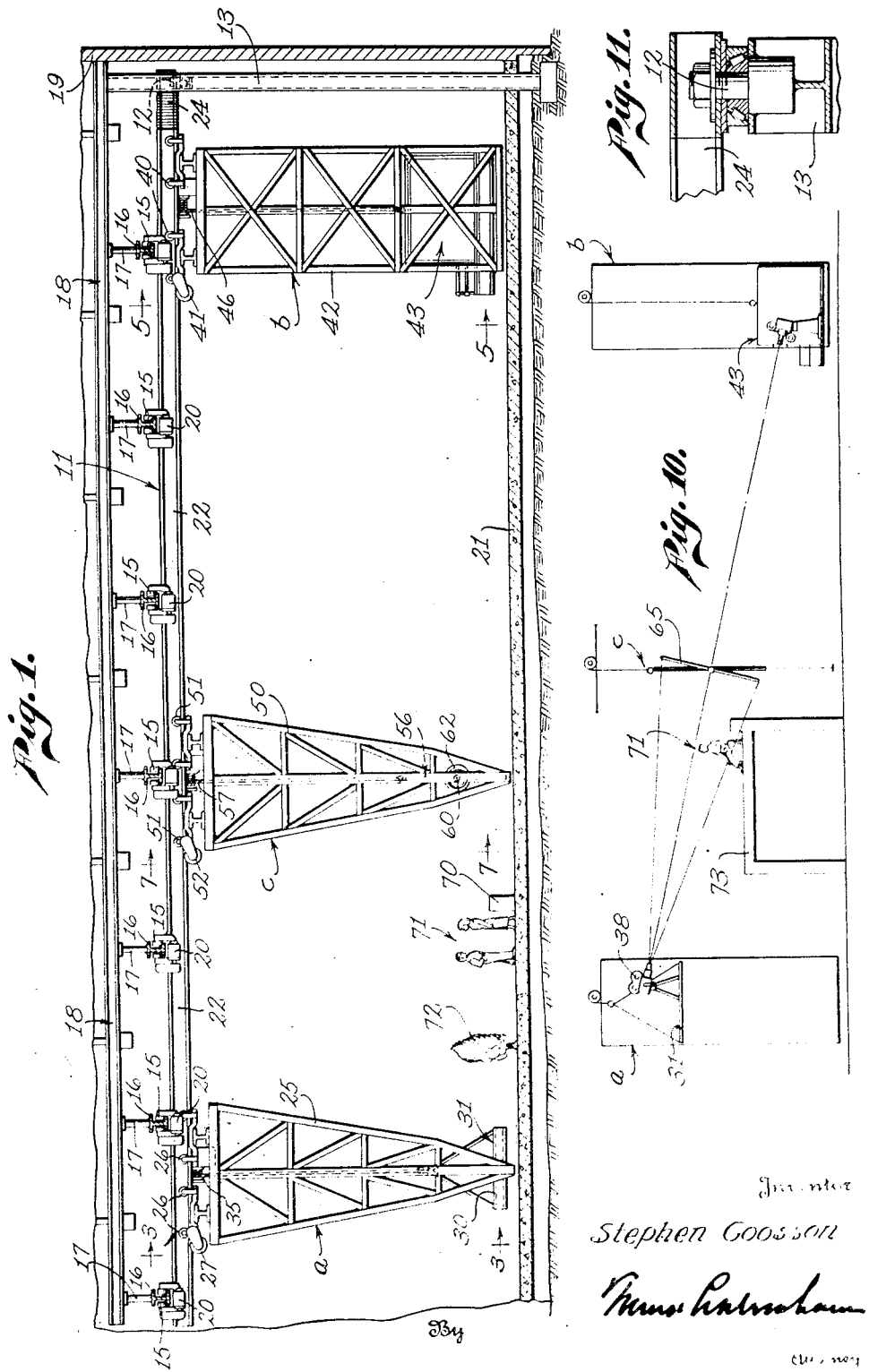
Fig. 1 is an elevation, partly in section, showing apparatus embodying a form of my invention and by means of which my method may be practiced.

In the operation of taking a process shot with the apparatus, above described, it is to be understood that the projector in the projection booth, projects a moving picture upon the translucent screen. This projected picture appears on the front of the screen where it is exposed to the camera in the camera unit. The picture projected on the screen, it is to be understood, may consist of any desired background, as for instance, the panorama of a city or any other scene. Arranged between the screen and the camera is suitable floor space upon which action may be arranged so that the camera in taking the action also includes the background which consists of the picture on the screen. If desired, a railing or wall such as indicated at 70, may be built upon the floor 21, the action taking place in front of the wall as indicated by the figures 71 and the still further realistic effect produced by placing shrubs or trees or other fixed objects such as indicated at 72 on the floor 21. This arrangement of stationary objects before the camera and the screen is diagrammatically illustrated in Fig. 1 and particularly in Fig. 9, which latter figure is a diagrammatical view showing the relative position of the units "a", "b" and "c" and illustrating the positions of the respective units as the same are moved by the boom about a common center. As appears from Fig. 9, the stationary objects, referred to, are arranged so that as the apparatus moves from the full line position, shown in Fig. 9, to the dotted line position shown in Fig. 9, different fixed objects come within the range of the camera, the action moving with respect to such objects and the screen. The floor space between the screen and the camera, it is to be understood, is to be utilized for the action such as moving people, vehicles or other moving objects and herein it is to be understood that the term "action" refers generally to any such moving things.

As diagrammatically illustrated in Fig. 10, the apparatus may be arranged or adjusted so that the shot is taken looking downwardly on the "action", in which case the camera elevator is in the raised position and the projector elevator in lowered position, the screen being arranged so that the plane of the screen is at right angles to the axis of the camera and projector lenses. When the parts of the apparatus are arranged as shown in Fig. 10, it is necessary to provide an elevated platform, indicated at 73, upon which the action takes place, this being necessary so that the action appears at least in front of a portion of the screen. It will also be understood that this arrangement of the units may be reversed so that the camera is pointed upwardly on the action.

It is to be further understood that the relative position of the units "a", "b" and "c" may be varied according to the desired effect to be produced on the finished picture, as for instance the camera may be moved inwardly on the boom 11 so as to give a closeup of the action in front of the screen or the screen unit may be moved independently of the other units on the boom so as to vary the distance of the screen with respect to the camera and projector.

It is to be further understood that it is desirable to synchronize the movement of the film in the camera with that of the film in the projecting machine which can be done in any well known manner.

While I have shown and described the means for swinging the boom as by motors 20 which operate the rollers 15 on the curved tracks 16 it may be desirable to mount a motor 80 outside the side walls 81 of the building as shown in Fig. 9. The motor 80 drives a cable 82 which passes over pulley 83 on the opposite wall the ends of the cable being attached to the boom. By this arrangement any noise of the motor being outside the building will not interfere with proper sound recording during taking of the picture.

While I have shown and described a preferred embodiment of apparatus it is to be understood that various changes in construction may be made without departing from the spirit of my invention.

I claim as my invention:

1. In apparatus for making process shots in motion picture photography: a stage floor; a supporting member pivotally mounted at one end to swing horizontally over the floor; camera, screen and projector units suspended from the supporting member in that order and means for moving said units relative to each other free of the floor; and means for swinging the supporting member.

2. In apparatus for making process shots in motion picture photography: a stage floor; a boom pivotally mounted at one end to swing horizontally above the floor, camera, screen and projector units movably mounted on the boom in that order independently of each other and a vertically movable pivotally mounted screen in the screen unit.

3. In apparatus for making process shots in motion picture photography: a stage floor; a boom pivotally mounted at one end to swing horizontally above the floor, camera, projector and screen units movably mounted on the boom independently of each other, said screen unit being between said camera and projector units; and a screen in the screen unit pivotally mounted therein and movable vertically in the screen unit; and a vertically movable elevator in each of said camera and projector units.

4. In apparatus for making process shots in motion picture photography: a boom pivotally mounted to swing horizontally; camera, projector and screen units suspended from said boom, said screen unit being between said camera and projector units; means for vertically moving said units independently of each other; curved tracks above the boom; and rollers mounted on the boom engaging said curved tracks to support the boom thereon.

STEPHEN GOOSSON.